United States Patent

Williams

[15] 3,645,339
[45] Feb. 29, 1972

[54] SPRING FINGERS FOR HARVESTING MACHINES

[72] Inventor: Julian E. Williams, 1441 North Central Ave., Tifton, Ga. 31714

[22] Filed: Feb. 25, 1970

[21] Appl. No.: 13,933

[52] U.S. Cl. .................................................171/61, 56/119
[51] Int. Cl. .................................................A01d 25/04
[58] Field of Search ..................171/61, 67, 31, 38; 56/119, 56/400, 19

[56] References Cited

UNITED STATES PATENTS

| | | |
|---|---|---|
| 1,989,152 | 1/1935 | Rassmann.................................171/61 |
| 2,754,648 | 7/1956 | Johnson et al...........................171/67 |
| 3,479,807 | 11/1969 | Tiura........................................56/400 |
| 3,512,345 | 5/1970 | Smith........................................56/400 |
| 1,956,676 | 5/1934 | Gray et al. ...............................56/119 |
| 3,059,703 | 10/1962 | Pearman....................................171/61 |

Primary Examiner—Antonio F. Guida
Attorney—Watson, Cole, Grindle & Watson

[57] ABSTRACT

The invention relates to a device applied to a harvesting machine and composed of spring fingers to guide and aid in gathering and directing vines or plants from the plow blade to thereby direct the plants and vines to a plurality of cooperating chains.

5 Claims, 3 Drawing Figures

PATENTED FEB 29 1972
3,645,339
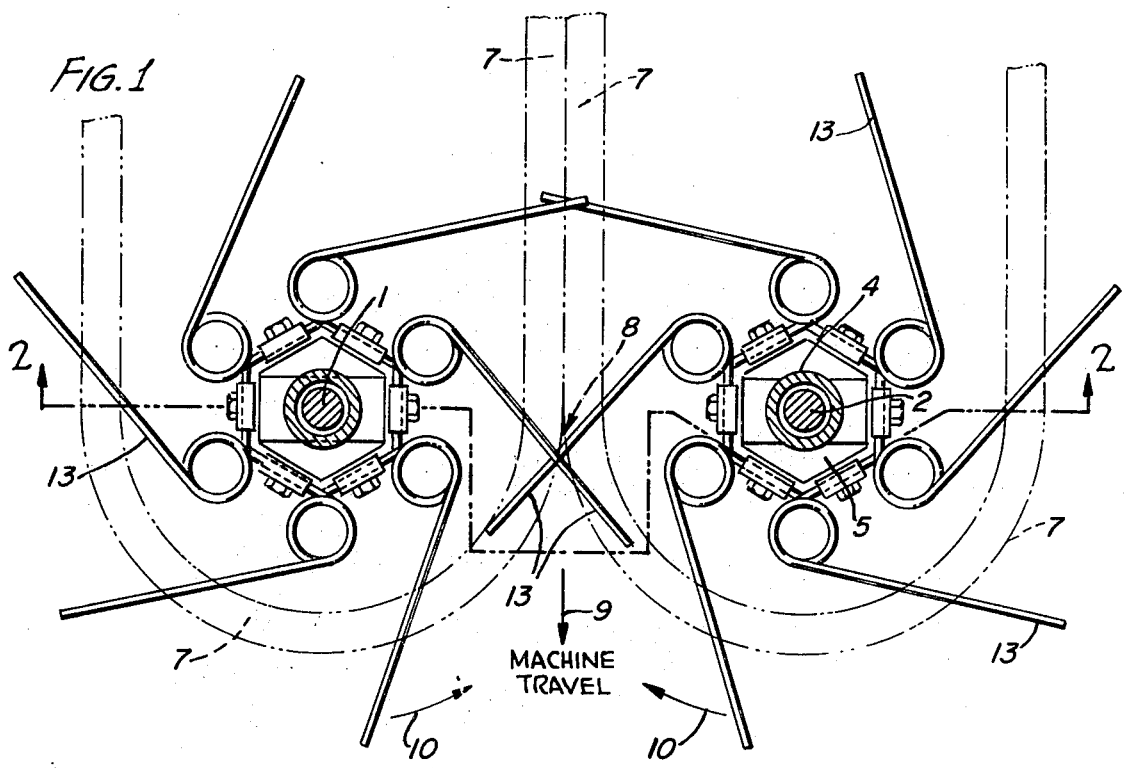
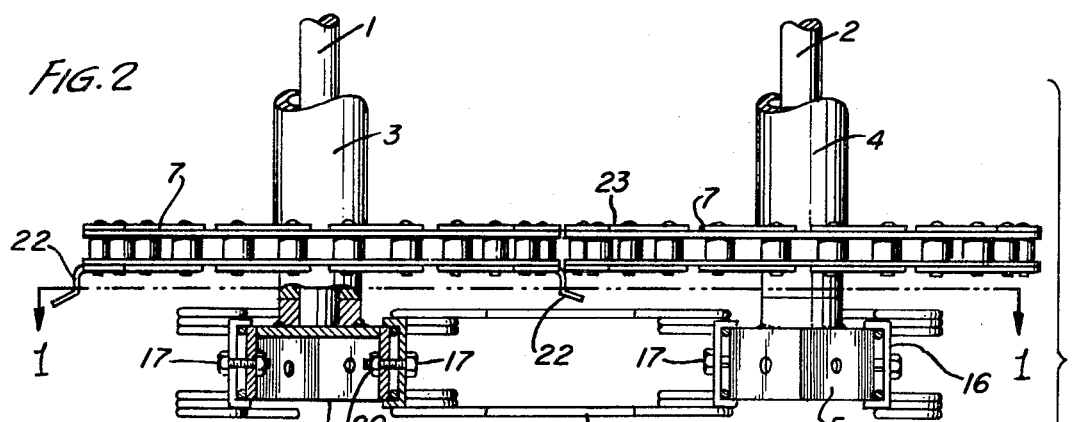
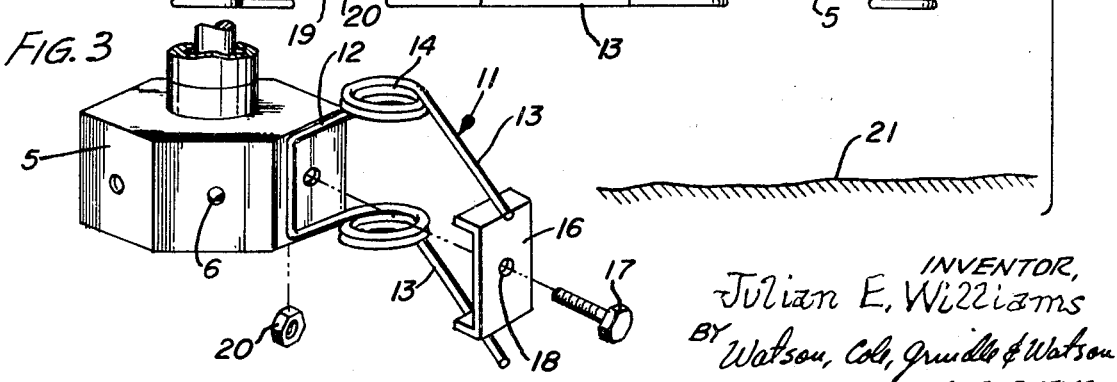
INVENTOR,
Julian E. Williams
BY Watson, Cole, Grindle & Watson
ATTORNEYS

SPRING FINGERS FOR HARVESTING MACHINES

This invention relates to a device for harvesting peanuts and various vegetables for use in a harvesting machine of the type as for example shown in U.S. Pat. No. 3,059,703 of Oct. 23, 1962.

It is an object of the invention to provide a plurality of spring fingers in cooperation with pairs of gathering chains between which the various plants are harvested. A further object of the invention resides in the provision of spring gathering fingers which will permit the gathering of the vines or plants directly from the plow blade or other type of harvester, to thereby prevent the blocking of flow of the vines and plants from the blade. This provides a most satisfactory way to gather and harvest various types of vegetables and vines as well as forage plants. It is a still further object of the invention to provide for the rotation of the spring or gathering fingers. The spring fingers are preferably mounted under the chains, that is between the latter and the ground.

Further objects of the invention will be apparent from the following description when considered in connection with the accompanying drawing in which;

FIG. 1 is a cross section taken on line 1—1 of FIG. 2 in the direction of the arrows to show the spring fingers in plan, FIG. 2 is a side elevation, partly in section of the mounted chains and spring fingers taken on line 2—2 of FIG. 1 in the direction of the arrows, and FIG. 3 is a perspective and partly exploded view of the mounting of a pair of spring fingers.

Referring to FIGS. 1 and 2, each shaft 1 and 2 has a surrounding sleeve 3 and 4 on which a hub member 5 is mounted preferably having a hexagonal peripheral shape as side surfaces each with a perforation 6 therein. A pair of cooperating chains 7 come together as shown in FIG. 1 at 8 and as indicated in that figure, the machine travels in the direction of the arrows 9.

The hub member 5 may have more or less than six sides depending upon the strength and size of the springs and as shown in FIG. 3 each spring member 11 is roughly U-shaped with a central U-portion 12 with two arms 13, each with a spring section 14 in a plurality of loops. The arms or fingers 13 extend outwardly in a direction opposite the direction of rotation of the forward shafts 1, 2. The U-portion 12 is secured on one side 5 of the hub and is secured in place by a U-shaped lug 16 and a bolt 17, the latter passing through a hole 18 in the lug 16. The hub member 5 is preferably open on the bottom 19 and a nut 20 is provided for each bolt 17.

As shown in FIG. 2, the ground is indicated at 21 and of course the fingers may have any suitable elevation above the ground 21 depending upon the size of the crops or plants to be harvested.

The machine operates as follows:

As the machine travels in the direction of the arrow 9 in FIG. 1, the spring fingers 13 move inwardly as indicated by the arrows 10 forcing the plants to be harvested to be guided between the chains 7. As shown in FIG. 2, the chain 7 at left has fingers 22 projecting downwardly from the left-hand sprocket and these fingers 22 are secured on the endless chain FIG. 2, approximately 12 inches apart. The inside chain 23 is not provided with these fingers.

The purpose of these fingers 22 is to aid in carrying vines on through the machine. This practically eliminates the trouble which would be caused by the vines clogging at the rear of the machine. As to the drive of the sprocket wheels and the chains, a drive mechanism may be used as shown and described in the U.S. Pat. No. 3,059,703.

I claim:

1. In a harvesting machine having a pair of endless gathering chains each disposed parallel to the ground in cooperative relationship with one another along a common line, each of said chains being movable along said line by means of a pair of spaced sprockets each mounted on spaced rotatable shafts forward and aft of the machine in the direction of its travel, means below said sprockets on each of said forward shafts being provided for guiding vines and plants into the machine between said gathering chains, said guide means comprising a multisided hub member and a plurality of spring fingers each mounted on one side of each said hub member, each of said spring fingers being disposed tangentially with respect to said forward shafts and extending outwardly in a direction opposite the direction of rotation of said forward shafts.

2. In a harvesting machine according to claim 1, in which each said spring finger is substantially U-shaped.

3. In a harvesting machine according to claim 1, in which each said spring finger is substantially U-shaped with each spring finger having loops to increase the spring action thereof.

4. In a harvesting machine according to claim 1, in which said hub is cup-shaped and opens downwardly, each of said spring fingers being mounted by means of a U-shaped lug and a bolt.

5. In a harvesting machine according to claim 1, in which each said spring finger has two extending prongs interconnected by a bight portion to facilitate mounting each said spring to said hub.

* * * * *